United States Patent
Israni et al.

(10) Patent No.: US 9,848,608 B2
(45) Date of Patent: Dec. 26, 2017

(54) METHOD FOR AN ADAPTIVE KNEADING TECHNOLOGY FOR A FOOD PREPARATION APPLIANCE

(71) Applicants: Pranoti Nagarkar Israni, Singapore (SG); Rishi Israni, Singapore (SG); Rizwan Syed, Singapore (SG); Kok-Choon Sim, Singapore (SG); Akhmad Fauzan, Singapore (SG); Shrugal Deepak Nagarkar, Singapore (SG); Sribarath Kannan, Singapore (SG)

(72) Inventors: Pranoti Nagarkar Israni, Singapore (SG); Rishi Israni, Singapore (SG); Rizwan Syed, Singapore (SG); Kok-Choon Sim, Singapore (SG); Akhmad Fauzan, Singapore (SG); Shrugal Deepak Nagarkar, Singapore (SG); Sribarath Kannan, Singapore (SG)

(73) Assignee: ZIMPLISTIC PVT. LTD., Singapore (SG)

(*) Notice: Subject to any disclaimer, the term of this patent is extended or adjusted under 35 U.S.C. 154(b) by 74 days.

(21) Appl. No.: 14/964,623

(22) Filed: Dec. 10, 2015

(65) Prior Publication Data
US 2016/0213009 A1 Jul. 28, 2016

Related U.S. Application Data

(62) Division of application No. 14/604,112, filed on Jan. 23, 2015, now Pat. No. 9,456,615.

(51) Int. Cl.
*A21D 8/02* (2006.01)
*A21C 1/02* (2006.01)
(Continued)

(52) U.S. Cl.
CPC ............... *A21D 8/02* (2013.01); *A21C 1/003* (2013.01); *A21C 1/006* (2013.01); *A21C 1/02* (2013.01); *A21C 1/145* (2013.01); *A21C 1/146* (2013.01); *A21C 1/149* (2013.01); *A21C 1/1425* (2013.01); *A21C 1/1455* (2013.01); *A21C 1/1465* (2013.01); *A21C 11/006* (2013.01); *B01F 15/00883* (2013.01)

(58) Field of Classification Search
CPC combination set(s) only.
See application file for complete search history.

(56) References Cited

U.S. PATENT DOCUMENTS 4,919,539 A * 4/1990 Drocco .................... A21C 1/02
366/224
5,007,820 A * 4/1991 Schwab ................. A21C 7/005
425/333

(Continued)

*Primary Examiner* — Anne M Antonucci
*Assistant Examiner* — Renee LaRose
(74) *Attorney, Agent, or Firm* — Geeta Kadambi; Riddhi IP LLC

(57) ABSTRACT

A method to make a single dough ball using adaptive kneading technology is explained. An adaptive kneading technology which resides in a processor is used to form an optimal viscoelastic dough ball. The flour and liquid are mixed, the initial dough is contacted, the reading for resistance is recorded, if need be corrected and finally a dough ball is dispensed to make a flat bread.

8 Claims, 4 Drawing Sheets

(51) Int. Cl.
*A21C 1/14* (2006.01)
*B01F 15/00* (2006.01)
*A21C 1/00* (2006.01)
*A21C 11/00* (2006.01)

(56) References Cited

U.S. PATENT DOCUMENTS

| | | | | |
|---|---|---|---|---|
| 5,630,358 A * | 5/1997 | Patel | ...................... | A21C 11/00 100/303 |
| 5,714,178 A * | 2/1998 | Keener | .................... | A21C 7/01 249/115 |
| 6,067,897 A * | 5/2000 | Grieco | ................. | A21C 11/004 425/337 |
| 7,562,838 B2 * | 7/2009 | Leung | ................. | A47J 43/0727 241/282.1 |
| 8,348,493 B2 * | 1/2013 | Brisciani | .............. | A21C 1/1425 366/142 |
| 8,695,905 B1 * | 4/2014 | Pagan | ................... | A47J 43/046 241/282.1 |
| 8,764,429 B1 * | 7/2014 | Voyatzakis | ................ | F26B 7/00 425/332 |
| 8,820,221 B2 * | 9/2014 | Israni | ...................... | A21C 1/02 99/349 |
| 2002/0044496 A1 * | 4/2002 | Lawson | ................ | A47J 43/085 366/314 |
| 2003/0010217 A1 * | 1/2003 | Torghele | .................. | A21C 9/04 99/348 |
| 2009/0145242 A1 * | 6/2009 | Pryor, Jr. | ................. | G01L 5/009 73/856 |
| 2013/0176811 A1 * | 7/2013 | Anderson | ........... | B01F 7/00408 366/77 |

\* cited by examiner

METHOD FOR AN ADAPTIVE KNEADING TECHNOLOGY FOR A FOOD PREPARATION APPLIANCE

CROSS REFERENCE TO RELATED APPLICATION

This application claims priority to and is continuation in part for a now pending U.S. Utility application Ser. No. 14/604,112 filed on Jan. 23, 2015 is hereby incorporated by reference in its entireties for all of its teachings.

FIELD OF THE INVENTION

This disclosure relates generally to an apparatus, system and method for an adaptive kneading technology for a food preparation appliance. More specifically it relates to the apparatus that is controlled by the software to optimize the consistency of the dough while kneading to make a dough ball.

BACKGROUND

Dough kneading mechanisms are found in food preparation appliances as well as industrial processes for making various dough products. Most of these mixers are top loaded and the final product as a dough is removed from the top when done. However, it is difficult to automate the removal of dough from the mixer in such a setup. These apparatus are good for disparate function where separate equipment is required for each step of cooking or baking goods. Due to this disadvantage that the kneading process is not fully optimized. There are varies types of flour that require different types of water and flour proportions to make a dough but it is human judgment that determines the quantity of both at present. There is a need to automate this process. There is a need for optimized dough making apparatus for an automated use.

SUMMARY OF INVENTION

The present invention describes a method of kneading and optimizing the kneading using adaptive kneading technology is disclosed. The kneading apparatus is a part of the bigger apparatus for making edible flat bread using a compact apparatus. In one embodiment, the kneading apparatus, system and method may be a standalone product that may be used for kneading dough. In one embodiment, the kneading mechanism has a kneading container, a blade assembly and a kneading base. In another embodiment, the kneading container has an open bottom face and the kneading base has a textured surface.

In another embodiment, the kneading base has a textured surface that may have a grove, protrusion surface, ridge, projection or combination thereof. In one embodiment, the kneading container has a handle and the bottom is open.

In one embodiment, the blade assembly has a shaft that is spring loaded and is attached to a spring load cell. In another embodiment, the kneading container is detachable and can be washed clean after every use. In another embodiment, the blade is a part of the blade assembly. In another embodiment, the blade has several planar surfaces to mimic the hand motion kneading of the dough to form an optimal dough ball for flattening and cooking.

In one embodiment the blade assembly is supported by a kneading subsystem. The kneading subsystem comprises of a strain gauge, load cell, engaging gear, motor, spring, and a processor to control the movements. In another embodiment, a processor has a software system that does detection of the hardness of the dough ball, correction if necessary of the hardness using either adding flour or water and recording the ratio for historical values and self-learning management system is done.

In one embodiment, a method of kneading a dough ball is described. Several steps are used to obtain an optimal viscoelastic consistency dough ball. In one embodiment as a method, receiving a quantity of flour to make a single dough ball from a dough dispenser is performed. In another embodiment, mixing a selected amount of oil and a suitable amount of water to mix with the flour to make one dough ball at a time and optimizing a consistency of the dough ball by using an adaptive kneading process residing in a processor to have an optimal viscoelastic consistency for the single dough ball to be flattened into a flattened dough. In one embodiment, the kneading base is raised upwards to close the kneading container and hold a unmixed flour, oil and water till it forms a dough ball; and a blade assembly is rotated to mix the flour, water and oil is received in a kneading container.

In one embodiment, as a novel system and method, an upwards pressure is exerted through the blade assembly to determining a strain value to measure the hardness of the dough ball and a correction the consistency of the dough ball is done by adding at least one of a flour and water. In another embodiment, the strain value is recorded three times to determine the consistency of the dough ball as the optimal viscoelastic consistency for a given flour for future use as part of the self-learning process by the processor for a given flour type. Each flour type has its own gluten content and this is important to understand the optimal process steps and the amount for calculation. In one embodiment, the dispensing the dough ball to a transfer base for using it to flatten is done by moving the kneading base and allowing the dough ball to fall into the transfer base.

In one embodiment, an adaptive kneading technology residing in the processor is applied to create a dough ball and recording a hardness index for the forming the dough ball using a type of flour. In another embodiment, for a method, a strain value of the flour to create the hardness index by the upward force exerted by the blade assembly is measured. In another embodiment, the flour is either added or water is added to correct the hardness index of the flour to obtain an optimal viscoelasticity consistency.

Other features and advantages will be apparent from the detailed description, taken in conjunction with the accompanying drawings, which illustrate, by way of example, the principles of the current apparatus and method.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from accompanying drawings and from the detailed description that follows.

DETAILED DESCRIPTION

Several components for a method of making a dough ball for flattening it to make a flattened edible are disclosed. Although the present embodiments have been described with reference to specific example embodiments, it will be evident that various modifications and changes may be made to these embodiments without departing from the broader spirit and scope of the various embodiments.

The adaptive kneading technology residing in the processor is a system for detection, correction and self-learning by the apparatus and all other parts associated with the kneading mechanism. Different flour types or brands have different water absorption capacity, the right proportion of flour and water is essential in achieving the right consistency of dough. Driven primarily by the inputs in the process, flour and water had to be pre-calibrated and is this was done by either human judgment or very expensive laboratory equipment. We have found a novel system to overcome this technological challenge. Innovative design for inducing stress on dough ball coupled with analysis of understanding of change in elasticity as a function of time and stress are inputs into the adaptive kneading technology system. The stress is measured in terms of force exerted on the blade by the developing dough. Constant recording and the adjustment to detect and correct is done till a threshold is reached that is between the golden band for viscoelastic consistency and then the dough ball is purged out to be flattened.

Figure 1:
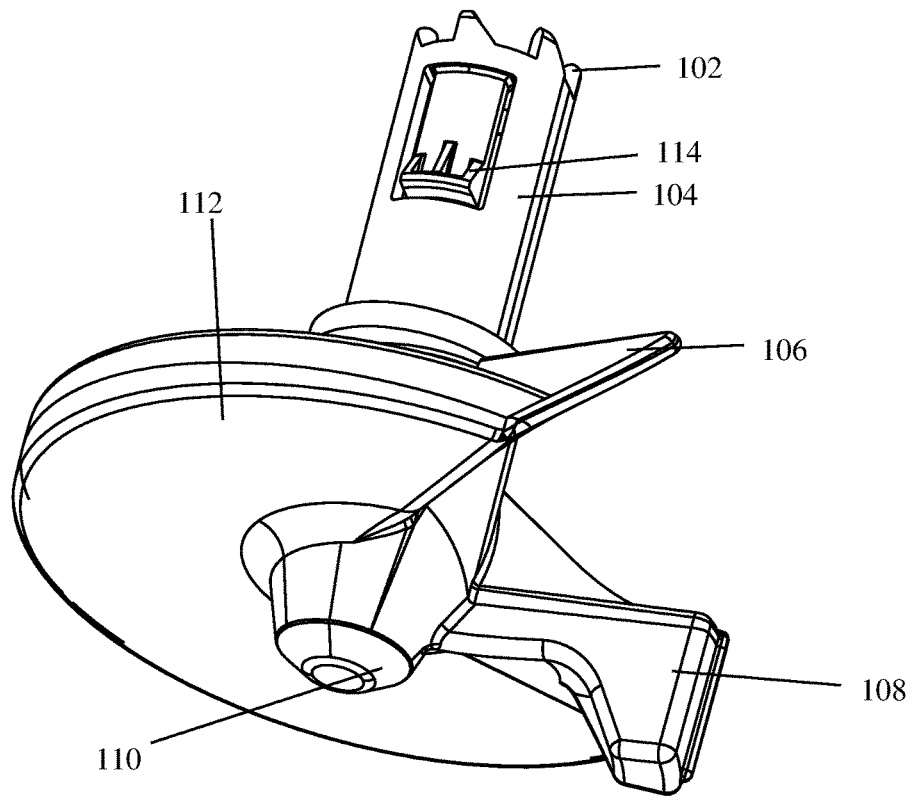
FIG. 1 shows a perspective view of the blade assembly, in one embodiment

FIG. 1 shows a perspective view of a blade assembly 110. The blade assembly is part of a kneading mechanism that will be discussed in the following paragraphs. The blade 110 comprises of a two dimensional and three planar face horizontal blade assembly that has a flat surface 112, upwards facing angular plane 106 and downwards facing vertical plane 108. This blade 110 is attached to a cylindrical shaft 102. The cylindrical shaft has a groove for locking 114 the kneading container 204. This locking mechanism 114 when unlocked also enables the kneading container to separate from the apparatus and be washed. The groves 102 at the end of the cylindrical shaft allow the whole blade mechanism to attach to an engaging gear and a spring gauge. The three dimensional structure of the blade with its angular planes imitates the hand kneading mechanism to create an optimal viscoelastic consistency dough ball for each flour type. The blade 110 while kneading feels the resistance from the dough ball and is forced upwards. The spring loaded blade shaft 104 which is also in contact with the spring gauge or a load cell registers the strain value in real time. The blade assembly 110 by engaging itself to a strain gauge provides the reading for strain value in real time. In real time a strain vs time graph is created and recorded for self-learning of the adaptive kneading technology that resides in a processor. Typical strain value is between 250-300 units which is the range of optimal viscoelastic consistency value for most flour. Since all flour have its own gluten content and other factors that influence the optimal viscoelastic consistency it is novel to record that in real time and keep that as an intelligent knowledge value to use for given flour when the resistance is encountered the very first time. No other dough kneading equipment has this automated feature for making single dough for any flour.

Figure 2:
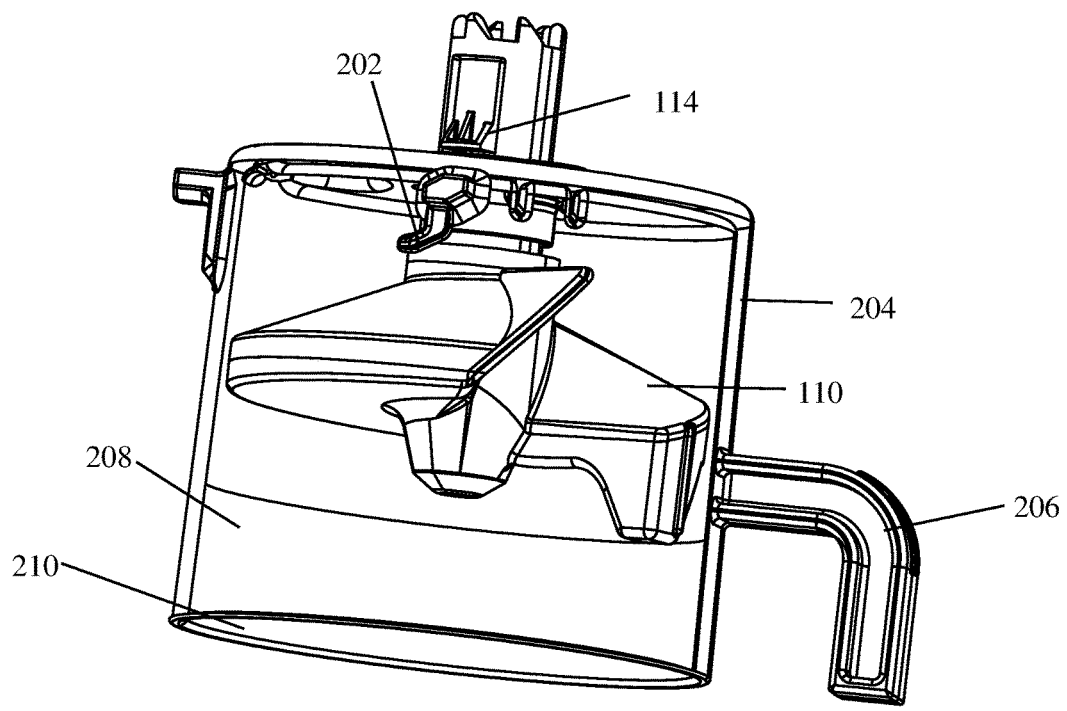
FIG. 2 shows an enclosure to house the blade assembly, in one embodiment.

FIG. 2 shows the kneading container 204 enclosing the blade assembly 110. The bottom opening 210 is not covered and the handle 206 enables the kneading container 208 to be dislodged from the machine and be washed properly. There is a lock mechanism 202 to secure the kneading container to the locking mechanism 114. The extra space inside the container 208 allows the dough ball to rotate without hindrance. The whole kneading container may be made up of transparent material and may be coated with food grade coating so it is not easily contaminated. Preferably, kneading container 204 has a bore at its top surface and blade assembly 102 extends through the bore into kneading container 101.

Figure 3:
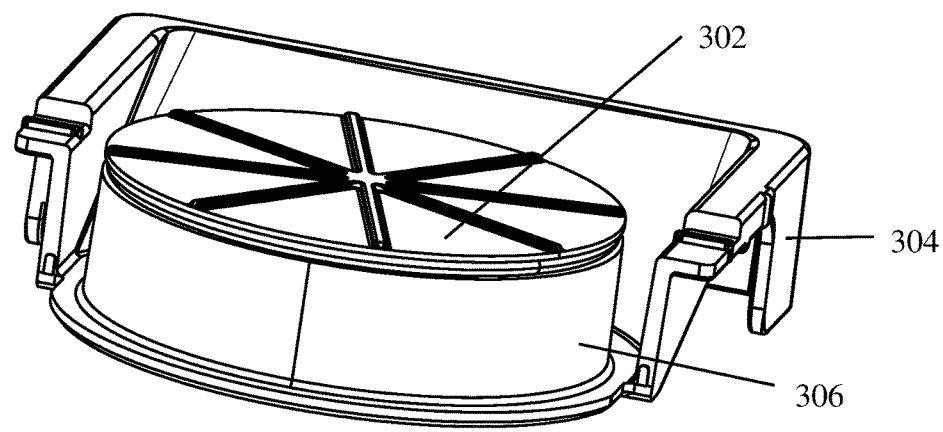
FIG. 3 shows the kneading base for the kneading apparatus, in one embodiment.

FIG. 3 shows the kneading base 306. This kneading base has a unique feature because it has a specially designed surface. The base stand 304 enables the user to hold it and get it out so it can be washed. The square surface 304 gives the stability for the round surface to move inside the container without resistance. The square part 304 also enables the food making machine to raise the base up and down the kneading container. The distance between the blade and the kneading base is controlled by the software residing in the processor. The surface is specifically designed so that the dough ball while being formed does not slip and a cohesive dough ball can be made easily. The textured surface 302 is at least one of a protrusion surface, groove, ridge, projection and a combination thereof. The kneading base also provides coverage for the kneading container so that the kneading container can receive the flour, water and oil for mixing to make a dough ball. The kneading base has at least one of a textured surface, made of a material with different frictional properties and a combination thereof, than the blade to support slip free kneading for kneading the dough in to a dough ball.

This allows the invention for creating a Kneading mechanism 100 comprises kneading container 204, blade assembly 102 and kneading base 306. Kneading container 204 is hollow and has an open bottom face. Preferably, kneading container 204 has a bore at its top surface and blade assembly 102 extends through the bore into kneading container 204. In the figures, textured surface 302 is shown to be protrusions extending radially from the center of kneading base 306. Textured surface 302 can be any form of protrusion, groove, ridge, projection or the like. What is important is that textured surface 302 applies a counter force to the dough product when it is being kneaded by blade assembly 102, thereby keeping the dough product in place and from slipping, so that mechanical forces can be effectively applied by blade assembly 102. Furthermore, textured surface 302 helps prevent the dough product from sticking to kneading base 306. Once kneading has been completed, kneading base 103 move downwards such that it no longer contacts kneading container 204, exposing the dough product. The dough product can then be easily transported to the cooking station to be cooked. The advantages are apparent here as the kneading operation disclosed herein can be easily automated.

Figure 4:
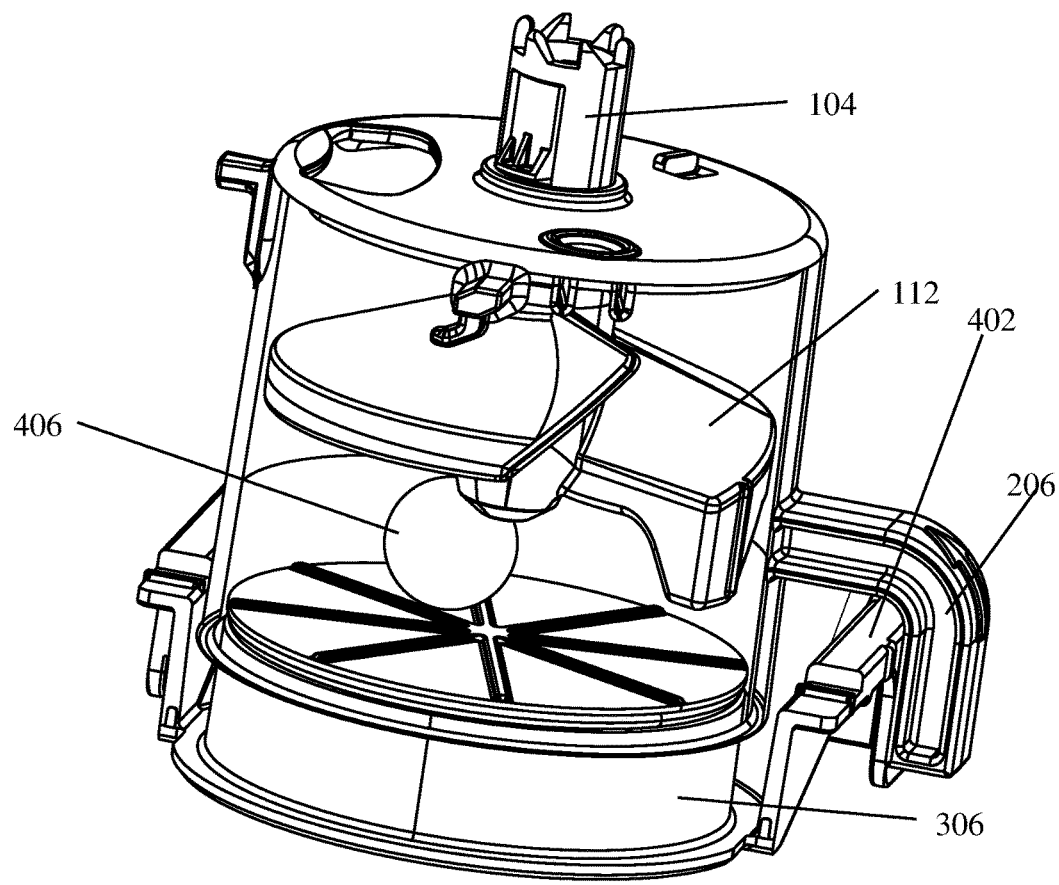
FIG. 4 shows the whole assembly for the kneading apparatus, in one embodiment.

FIG. 4 shows the whole assembly of the kneading base 306 with the kneading container handles 206 locked in with a secure clasp 402 and dough ball 406 made and placed between the kneading base and the blade mechanism of the blade assembly 122. The shaft of the blade assembly 104 is outside the kneading container to be connected with the gear box and motor. The speed of this motor is software controlled using feedback from an encoder.

Figure 5:
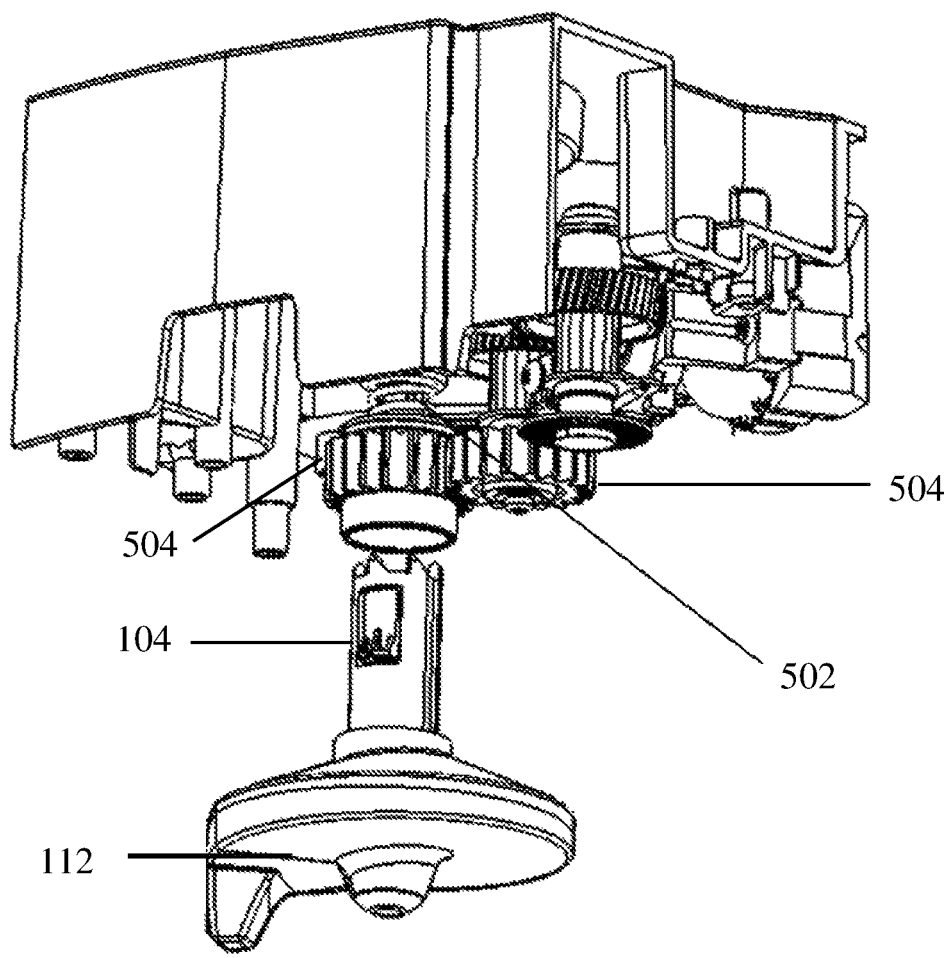
FIG. 5 shows the gears and wheels attached to the blade shaft, in one embodiment.

FIG. 5 shows the shaft 104 of the blade 110 engaging with the gear box 504 and being attached to the spring 502. The gear box in turn is connected with the motor 504. This whole assembly drives the blade assembly and is controlled by the processor.

Figure 6:
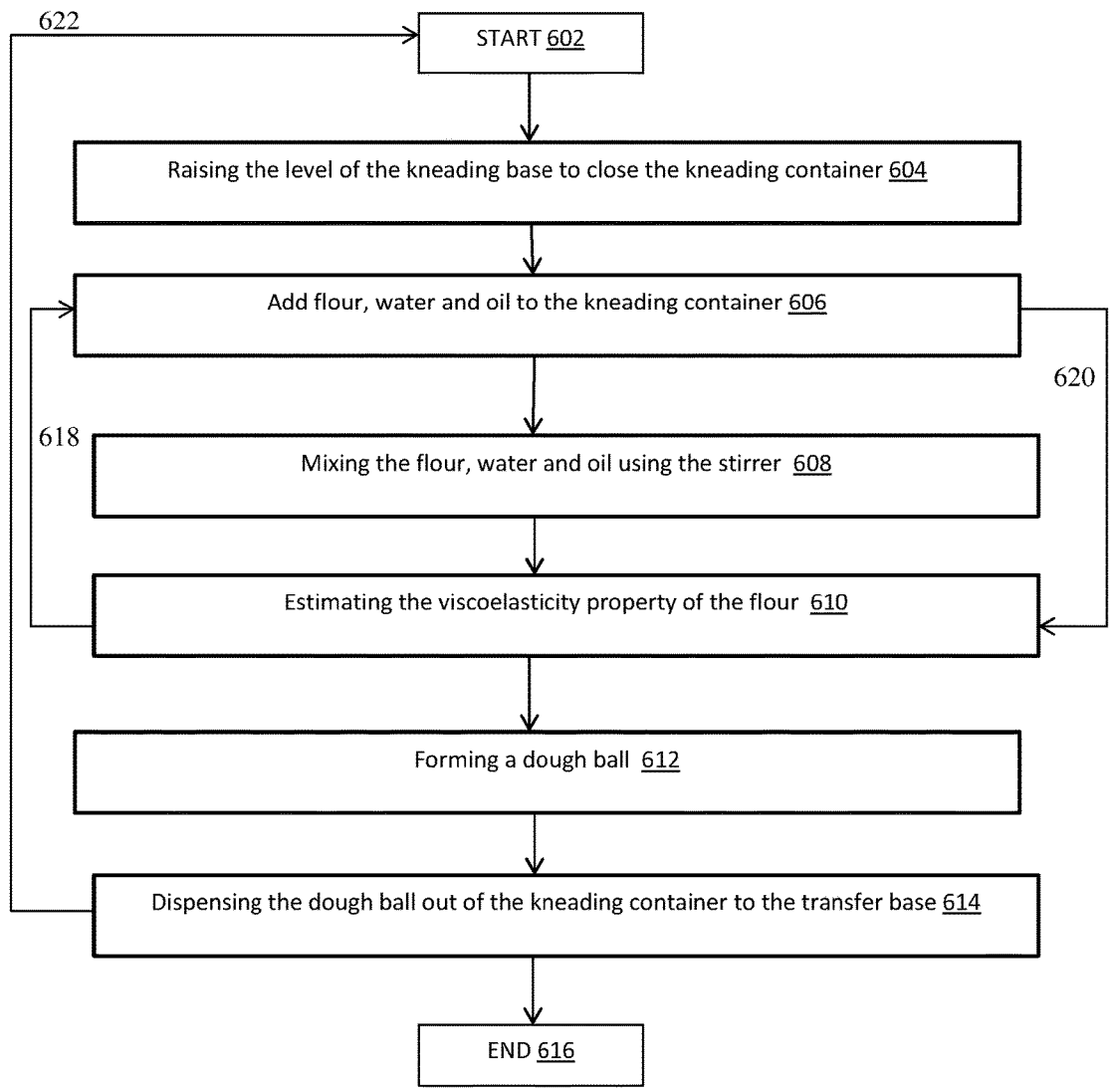
FIG. 6 shows a flow chart for a method of making the dough ball.

FIG. 6 shows the method of making the dough ball. To initiate or start 602 the kneading operation, and before dispensing of water and flour, kneading base 306 moves up to contact 606 kneading container 204, effectively sealing the open bottom face of kneading container 204. Water, oil and flour is then dispensed 606 to be received into kneading container 204. Blade assembly 110 than rotates and stirs and mixes the water and flour mixture to begin kneading 608. During kneading, kneading base 306 (a kneading base having a textured surface to support slip free kneading for kneading the dough in to a dough ball) can move downwards such that it no longer contacts kneading container 204. Wherein the textured surface is at least one of a protrusion surface, groove, ridge, projection and a combination thereof. Kneading may be done when adjusting the rotational speed of blade assembly 110 to properly form a dough ball. Kneading may also be done in the event when there is a large quantity of flour, so blade assembly 110 requires more displacement from kneading base 306 to apply sufficient mechanical force to form well kneaded dough. The detection of hardness is done to estimate and optimize the viscoelasticity property of the flour 610. This is an important step because the dough ball once formed and dispensed cannot be used if it is not of proper consistency and will stick to the flattening surface and the cooking surface and the machine will be halted from further use. Once the hardness of the dough ball is detected the correction may be made in two ways. If the hardness is very less than some more flour may be added while making the dough by kneading and if the hardness is high then water may be added to reduce the hardness and make an optimal viscoelastic property having dough ball. The detection of hardness is done there times to not only average and correct but to record for historical purposes for that particular flour.

The repetition of the process for correction is shown in process 618. Once an ingredient is added than the determination of hardness is performed again at step 620. The formation of the dough ball then takes place 612. The dough ball is than dispensed out of the kneading container to the transfer base 614. The transfer base is not shown in this instance specifically as an apparatus but can be seen in the cited prior depended application. Once the machine runs out of flour the process is ended 616. The novel adaptive kneading technology as described above also has a self-learning process by creating a golden band of strain value for the strain vs time graph for each flour type between 250-300 units.

Although the present embodiments have been described with reference to specific example embodiments, it will be evident that various modifications and changes may be made to these embodiments without departing from the broader sprit and scope of the various embodiments. Accordingly, the specification and drawings are to be regarded in an illustrative rather than a restrictive sense.

What is claimed is:

1. A method of kneading a dough ball, comprising:
receiving a quantity of flour to make a single dough ball from a dough dispenser;
mixing a selected amount of oil and a suitable amount of water to mix with the flour to make one dough ball at a time;
making the dough ball by using an adaptive kneading process technology residing in a processor to have a viscoelastic consistency for the single dough ball to be flattened into a flattened dough, and
automatically correcting the mixture of a mixed flour and water if an optimal viscoelastic consistency is not reached during kneading by instructing either the flour dispenser or a water dispenser or flour and water dispensers to dispense a unit quantity automatically as per correction requirement into a kneading container to make the single dough ball having the optimal viscoelastic consistency.

2. The method of claim 1, further comprising:
raising a kneading base to close a kneading container and hold a unmixed flour, oil and water till it forms a dough ball; and
rotating a blade assembly after the flour, water and oil is received in the kneading container.

3. The method of claim 2, further comprising:
exerting an upwards pressure through the blade assembly to determining a strain value to measure a hardness of the dough ball;
correcting the consistency of the dough ball by adding at least one of a flour and water;
recording the strain value three times to determine the consistency of the dough ball as the viscoelastic consistency for a given flour for self-learning process by a processor for a given flour type; and
dispensing the dough ball to a transfer base and flattening the dough ball to make a flattened dough.

4. A method of kneading a dough ball, comprising:
raising a kneading base to close the kneading container to receive a flour, oil and water to form a dough ball;
rotating a blade assembly after the flour, water and oil is received in the kneading container; and
applying an adaptive kneading technology residing in the processor to create a dough ball and recording a hardness index for the forming the dough ball using a type of flour.

5. The method of claim 4, further comprising:
measuring a strain value of the flour to create the hardness index by the upward force exerted by the blade assembly.

6. The method of claim 5, further comprising:
adding the flour if the hardness index is below the threshold to make the dough ball firmer.

7. The method of claim 5, further comprising:
adding the water if the hardness index is above a threshold to make the dough ball softer.

8. The method of claim 4, further comprising:
recording an amount of flour, water and oil used for making the dough ball for a given batch of flour, water and oil; and
dispensing the dough ball to a transfer base and flattening the dough ball to make a flattened dough.

* * * * *